United States Patent Office 3,704,305
Patented Nov. 28, 1972

3,704,305
N-(γ-PHENYLPROPYL)-N'-(SUBSTITUTED)-PIPERAZINES
Claude P. Fauran, Michel J. Turin, and Guy M. Raynaud, Paris, and Bernard M. Pourrias, Meudon, France, assignors to Delalande S.A., Courbevoie (Hauts-de-Seine), France
No Drawing. Filed Aug. 19, 1969, Ser. No. 851,483
Claims priority, application Great Britain, Sept. 4, 1968, 41,965/68
Int. Cl. C07d 51/70
U.S. Cl. 260—268 R          3 Claims

ABSTRACT OF THE DISCLOSURE

A compound of the formula

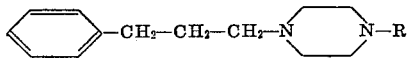

wherein R is alkoxy carbonylalkyl, cyanoalkyl, or hydroxyalkyl substituted by phenyl or phenyl substituted by alkoxy.
The compounds are prepared by reacting 1-bromo-3-phenylpropane with piperazine substituted with R. The compounds possess hypotensive, vasodilatory, adrenolytic, spasmolytic and diuretic properties.

---

The present invention concerns new derivatives of N-(γ-phenylpropyl) piperazine, their process of preparation and their therapeutic application.

The new compounds according to the present invention correspond to the general formula:

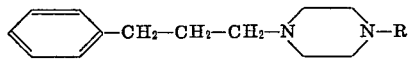

in which R represents a chain having 1 to 6 carbon atoms, selected from amongst the following:
alkoxycarbonylalkyl
cyanoalkyl
hydroxyalkyl substituted by a phenyl nucleus itself possibly being substituted by an alkoxy group.

The process according to the present invention consists of reacting 1-bromo-3-phenylpropane of the Formula II

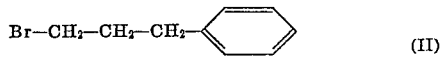

with a monosubstituted piperazine of the general Formula III:

in which R is as defined above in Formula I. The reaction is carried out in an appropriate solvent, such as acetone or benzene, and the hydrobromic acid liberated during the reaction is fixed by an alkali or alkaline earth metal carbonate.

The following preparations are given as non-limitative examples to illustrate the present invention.

EXAMPLE 1

N-(γ-phenylpropyl)-N'-(ethoxycarbonylmethyl)-piperazine 52 g. of N-(ethoxycarbonylmethyl) piperazine is dissolved in 300 ml. of acetone and 32 g. of sodium carbonate is added thereto whilst agitating. 60 g. of 1-bromo-3-phenyl-propane are progressively added thereto and the mixture is refluxed for 6 hours. After cooling, the acetone is removed by distillation, the mixture is taken up in water and extracted with ethyl acetate. After concentration of the organic phase, a residue is obtained which is purified by distillation.

B.pt.$_{0.01}$ mm. Hg=163°–166° C. Yield=71%.
Elementary analysis.—Calculated (percent): C, 70.31; H, 9.02; N, 9.65. Found (percent): C, 70.36; H, 8.82; N, 9.88.

The base obtained above may be treated with maleic acid in an acetonic solution to form the corresponding salt. M.pt.=105° C.

EXAMPLE 2

N-(γ-phenylpropyl)-N'-(cyanomethyl)-piperazine

N-(γ-phenylpropyl)-N'-(cyanomethyl) - piperazine is obtained from N-(cyanomethyl) piperazine and 1-bromo-3-phenyl-propane according to the procedure described in Example 1.

B.pt.$_{0.05}$ mm. Hg=158°–162° C. Yield=63%.
Elementary analysis.—Calculated (percent): C, 74.03; H, 8.70; N, 17.27. Found (percent): C, 74.12; H, 8.69; N, 17.55.

The base obtained above may be treated with maleic acid to form the corresponding maleate. M.pt.=135° C.

EXAMPLE 3

N - (γ - phenylpropyl) - N'-(2-(p-methoxyphenyl)-2-hydroxy-1-propyl)-piperazine dihydrochloride 48 g. of N-(2-(p-methoxyphenyl)-2-hydroxy-1-propyl)-piperazine is dissolved in 500 ml. of acetone and anhydrous sodium carbonate is added thereto. 40 g. of 1-bromo-3-phenyl-propane in solution in 100 ml. of acetone is then added thereto. The mixture is then refluxed for 15 hours. The mixture is thereafter concentrated by distillation and is taken up in water and hydrochloric acid. The aqueous solution is extracted with ether and then neutralized with soda. The organic product separates out and is extracted with ether. The etherified solution is treated with gaseous hydrochloric acid and the dihydrochloride formed is dried and recrystallized in ethanol at 96°.

M.pt.=194° C. Yield=65%.
Elementary analysis.—Calculated (percent): C, 62.58; H, 7.76; N, 6.35. Found (percent): C, 62.38; H, 7.96; N, 6.40.

EXAMPLE 4

N-(γ-phenylpropyl)N'-(2-hydroxy-2-phenyl-1-propyl)-piperazine dihydrochloride

N-(γ-phenylpropyl)-N'-(2 - hydroxy - 2 - phenyl-1-propyl)-piperazine dihydrochloride is obtained from N-(2 - hydroxy - 2 - phenyl - 1 - propyl)-piperazine and 1 - bromo - 3 - phenyl-propane according to the procedure described in Example 4.

M.pt.=215° C. Yield=71%.
Elementary analysis.—Calculated (percent): C, 64.22; H, 7.84; N, 6.81. Found (percent): C, 64.41; H, 7.70; N, 6.83.

The compounds according to the present invention have been tested on animals and have been found to possess a therapeutic activity.

In particular they have shown: hypotensive properties evident from tests on cats and dogs after intravenous adminstration, a dose equal to 1/20 of the $LD_{50}$ for mice being effective.

The results obtained with two of the compounds of the general Formula I are shown below in Table I.

TABLE I

| R | Salt | Dose at which hypotension is produced |
|---|---|---|
| —CH₂—C(OH)(CH₃)—C₆H₄—OCH₃ | 2 HCl | 5 mg./kg./IV. |
| —CH₂—C(OH)(CH₃)—C₆H₅ | 2 HCl | 3.5 mg./kg./IV (extended hypotension). |

(2) Vasodiliatory properties at the peripheral level evidenced in rabbits and dogs after administration into an artery, by studying the resultant effect by means of a Shipley and Wilson rotor meter. The results obtained with two of the compounds of the general Formula I are represented in Table II below.

TABLE II

| R | Salt | Dose administered, mg./kg. | Increase in the femoral discharge, percent |
|---|---|---|---|
| —CH₂—C(OH)(CH₃)—C₆H₄—OCH₃ | 2 HCl | 125 | 100 |
| —CH₂—C(OH)(CH₃)—C₆H₅ | 2 HCl | 150 | 100 |

(3) Adrenolytic properties which are evidenced by an inhibition of the variations of the arterial pressure following the injection of adrenalin into a cat and the contractions of the isolated seminal vesicule of the rat by following the affusion of adrenalin.

By way of example, the inversion of the adrenalinic hypotension occurs at 5 mg./kg./IV for N-(γ-phenylpropyl)-N'-(ethoxycarbonylmethyl)piperazine maleate.

Concerning the antagonism exercised by the compounds of Formula I in relation to that produced by adrenalin on the isolated seminal vesicule of the rat, the results obtained with three of the said compounds are shown in Table III below, with respect to the activity of yohimbine.

TABLE III

| R | Salt | Activity |
|---|---|---|
| —CH₂—CO—OC₂H₅ | Maleate | 1/4 yohimbine. |
| —CH₂—C(OH)(CH₃)—C₆H₄—OCH₃ | 2 HCl | 1/6 yohimbine. |
| —CH₂—C(OH)(CH₃)—C₆H₅ | 2 HCl | 1/4 yohimbine. |

(4) Spasmolytic properties evidenced in the isolated duodenum of the rat exposed to the contraction effect of barium chloride, this activity being of the papaverinic type.

By way of example, the activity of N-(γ-phenylpropyl) N' - (2 - hydroxy 2 - phenyl 1 - propyl) piperazine dihydrochloride is equal to that of papaverine.

(5) Diuretic properties evidenced in rats and shown by a notable increase of the urinary elimination of water, and sodium and chloride ions, without much variation in the elimination of potassium.

By way of example, the oral administration of 50 mg./kg. of N - (γ - phenylpropyl) N' - (2 - (p - methoxyphenyl) 2 - hydroxy 1 - propyl) piperazine dihydrochloride doubles the elimination of water and the ions $Na^+$ and $Cl^-$.

As is brought out by the above, and by Table IV below, the difference between the pharmacologically active dose and the lethal dose is sufficiently great to allow the compounds to be used therapeutically.

TABLE IV

| | | $DL_{50}$ in mice | |
|---|---|---|---|
| R | Salt | I.V., mg./kg. | Per os., mg./kg. |
| —CH₂—CO—C₂H₅ | Maleate | 85 | |
| —CH₂—C(OH)(CH₃)—C₆H₄—OCH₃ | 2HCl | 46 | 260 |
| —CH₂—C(OH)(CH₃)—C₆H₅ | 2 HCl | 38 | 265 |

The compounds of the general Formula I can be used to treat cardio-vasculary diseases with hypotension, peripheral circulatory diseases, arteritis, digestive spasms such as oesophageal or gastro-intestinary spasms, visceral spasms such as hepatic and renal colics, and uterine spasms, oedemas and hydrosodic retention syndromes.

They are administered in the form of tablets and suppositories containing from 1 to 100 mg. of active ingredient, injectable ampoules containing from 1 to 50 mg. of active ingredient or drops containing 0.1 to 5% active ingredient.

What we claim is:
1. A compound of the formula

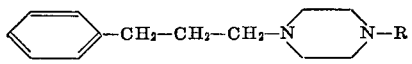

in which R is

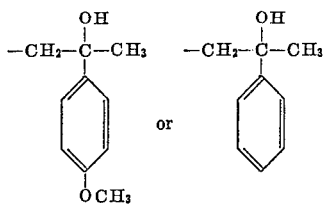

and the pharmacologically acceptable acid addition salts thereof.

2. A compound according to claim 1 in which R is

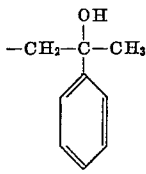

3. A compound according to claim 1 in which R is

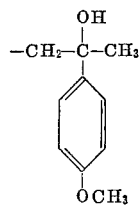

References Cited
UNITED STATES PATENTS

| | | | |
|---|---|---|---|
| 2,858,312 | 10/1958 | Olin | 260—268 R |
| 2,952,681 | 9/1960 | Dodson | 260—268 R |
| 3,239,528 | 3/1966 | Von Bebenburg | 260—268 R |
| 3,318,876 | 5/1967 | Cignarella | 260—268 X |
| 3,322,768 | 5/1967 | Schorr | 260—268 R |
| 3,373,161 | 3/1968 | Berege | 260—268 R |
| 3,180,867 | 4/1965 | Shapiro | 260—268 R |
| 3,472,854 | 10/1969 | Archer | 260—268 CU |
| 3,505,334 | 4/1970 | Regnier | 260—268 |
| 2,928,834 | 3/1960 | Shapiro | 260—268 R |
| 3,580,914 | 5/1971 | Pedrazzoli et al. | 260—268 R |
| 3,573,291 | 3/1971 | Fauran et al. | 260—240 |

FOREIGN PATENTS

| | | | |
|---|---|---|---|
| 3,921,852 | 5/1964 | Japan | 260—268 RX |

OTHER REFERENCES

Irikura et al., Jour. Med. Chem., vol. 11, pp. 801–4, 1968.

DONALD G. DAUS, Primary Examiner

U.S. Cl. X.R.

260—268 CN; 424—250